United States Patent
Gutierrez, Jr. et al.

(10) Patent No.: US 9,986,450 B2
(45) Date of Patent: May 29, 2018

(54) RESOURCE CONSUMPTION ESTIMATION WITH OUT OF NORM DETERMINATION IN MOBILE DEVICES

(71) Applicants: Alberto Gutierrez, Jr., San Mateo, CA (US); Chang Jia Wang, San Ramon, CA (US)

(72) Inventors: Alberto Gutierrez, Jr., San Mateo, CA (US); Chang Jia Wang, San Ramon, CA (US)

(73) Assignee: CARRIER IQ, INC., Sunnyvale, CA (US)

( * ) Notice: Subject to any disclaimer, the term of this patent is extended or adjusted under 35 U.S.C. 154(b) by 787 days.

(21) Appl. No.: 13/933,126

(22) Filed: Jul. 2, 2013

(65) Prior Publication Data
US 2015/0011177 A1    Jan. 8, 2015

(51) Int. Cl.
*G06F 1/00* (2006.01)
*H04W 24/08* (2009.01)
*H04W 4/00* (2018.01)

(52) U.S. Cl.
CPC ............ *H04W 24/08* (2013.01); *H04W 4/003* (2013.01)

(58) Field of Classification Search
CPC .. G06F 11/3409; G06F 1/3203; G06F 11/328; G06F 2201/88; G06F 11/0742; G06F 11/3065; H04W 24/08; H04W 28/0221
See application file for complete search history.

(56) References Cited

U.S. PATENT DOCUMENTS

| | | | | |
|---|---|---|---|---|
| 8,935,393 | B1* | 1/2015 | Jackson et al. | 709/224 |
| 2009/0287433 | A1* | 11/2009 | Houston | G01R 22/10 |
| | | | | 702/62 |
| 2011/0040990 | A1* | 2/2011 | Chan | G06F 1/28 |
| | | | | 713/300 |
| 2011/0072293 | A1* | 3/2011 | Mazzaferri | G06F 1/3203 |
| | | | | 713/340 |
| 2011/0072378 | A1* | 3/2011 | Nurminen | G06F 1/32 |
| | | | | 715/771 |
| 2011/0191609 | A1* | 8/2011 | Van Bokhoven et al. | 713/310 |
| 2012/0158621 | A1* | 6/2012 | Bennett | G06F 17/30675 |
| | | | | 706/12 |
| 2013/0007255 | A1* | 1/2013 | Gerber et al. | 709/224 |
| 2013/0159395 | A1* | 6/2013 | Backholm | H04L 29/08099 |
| | | | | 709/203 |
| 2013/0159511 | A1* | 6/2013 | Backholm | H04L 29/08099 |
| | | | | 709/224 |
| 2014/0143568 | A1* | 5/2014 | Kim | G06F 1/3206 |
| | | | | 713/323 |
| 2014/0173319 | A1* | 6/2014 | Zeng | G06F 11/3013 |
| | | | | 713/340 |

(Continued)

*Primary Examiner* — Thomas Lee
*Assistant Examiner* — Zhipeng Wang
(74) *Attorney, Agent, or Firm* — Workman Nydegger

(57) ABSTRACT

A method estimates resource consumption between applications within and among a population of wireless mobile devices. Aggregating and analyzing samples for each member of the population of devices provides comparable individual results. Subsequently aggregating and analyzing only summary information for each member of the population of devices provides cluster, crowd, and global comparisons. An apparatus determines out of norm behavior of an individual within a crowd, or relative differences between two crowds.

13 Claims, 4 Drawing Sheets

(56) References Cited

U.S. PATENT DOCUMENTS

2014/0188412 A1* 7/2014 Mahajan ............... G06F 1/3206
                                                      702/63
2015/0006677 A1* 1/2015 Mahajan ................ H04L 67/02
                                                      709/219

* cited by examiner

RESOURCE CONSUMPTION ESTIMATION WITH OUT OF NORM DETERMINATION IN MOBILE DEVICES

RELATED APPLICATIONS

NONE.

BACKGROUND

Wireless operators are overwhelmed by explosive growth of new applications for mobile and wireless devices. Approximately 500 new apps per day are causing significant issues to consumer wireless communication networks and customer satisfaction. Subscribers enthusiastically adopt new functionality as they concurrently complain about limited smartphone battery life and quality of experience. This may be due to certain applications being greedy in draining battery and consuming resources such as CPU, memory, and bandwidth for transmitting and receiving data volume.

Referring to FIG. 1 a conventional data collection and analysis system is illustrated for comparison with the invention disclosed below. A plurality of user devices reports metrics/measures/data collected in packages through a network to a data store which organizes event data into tables known as Facts. Tables which have common dimensions with other tables may be "joined" to create a more complex "rich Fact". Measures of the resource consumption of various Apps installed on the user devices are extracted from all of the tables. Because not all users have the same Apps, and the usage of each App varies widely, no two Apps exhibit the same activity profile ("activity data"). For example, the number of times it is opened and closed, length of time it is used, the data it sends and receives from the network, the CPU it consumes, the memory it consumes and the battery capacity it consumes. Means, medians, standard deviations, and various statistical results may be obtained from the activity data and reported in tabular or graphical form which report the relative consumption of resources among the Apps. However, because a minority of enthusiastic users may contribute high activity for an application, while others may generate low activity, these reports may not be useful for all purposes. All things being equal, some extremely active applications, activity due to one user or one app, can overwhelm the statistics of other users or another app. Furthermore, an explicit measurement of application resource consumption (battery drain, CPU usage, memory use, tx data, rx data) may not be available.

What is needed is a way to estimate the resource consumption of each App and to identify: 1) for an individual user on a specific device App resource consumption and over consumption relative to other Apps on other devices on a class or group of devices or on all devices in the population and 2) which Apps over consume resources relative to other Apps for the set of all users on a class or group of devices or on all devices in the population.

BRIEF DESCRIPTION OF DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

SUMMARY OF THE INVENTION

Figure 1:
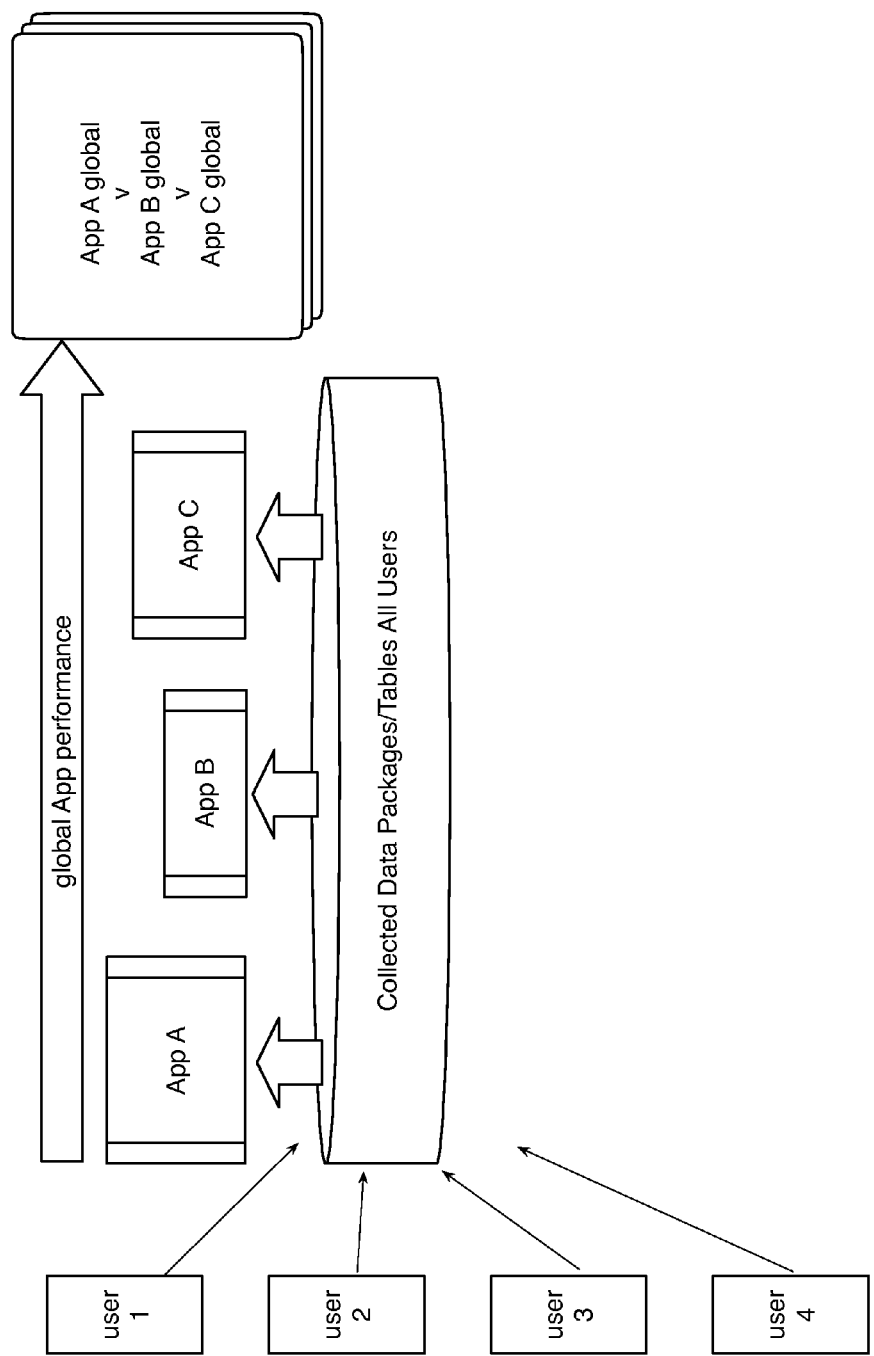
FIG. 1 is a block diagram and
FIGS. 2-4 are flowcharts of method steps.

The disclosed method for estimating resource consumption within and among a population of mobile devices has two phases. First, the method includes aggregating and analyzing samples for each member of the population of devices and establishing device aggregate statistics (aggregates for each device). Subsequently, the method includes aggregating device aggregate information from each member of the population of devices across devices in order to establish global or crowd level aggregates. Each device is equally represented in the final analysis.

A key element in this system is a method for estimating App resource consumption by sampling within a device to establish per device level means and statistics and then sampling across devices in order to infer aggregate means and statistics for each App. Then, from these App resource estimates to estimate when an App within one device (i.e., user) exceeds normal resource consumption compared to a large population of users or which Apps consistently over consume resources when compared to the population of Apps for a large population of users.

Summarizing by device simplifies the crowd statistics and supports an individual user quality of experience measurement with scalability both in number of users (large to small) and accuracy of results from large to small number, especially for small sample sizes.

DETAILED DISCLOSURE OF EMBODIMENTS

The method of operation is distributed across a plurality of servers to scale from individuals to crowds to the universe of end-user devices. The following disclosure applies to one apparatus for ease of apprehension but its preferred mode embodiment is in a parallel array.

Reference will now be made to the drawings to describe various aspects of exemplary embodiments of the invention. It should be understood that the drawings are diagrammatic and schematic representations of such exemplary embodiments and, accordingly, are not limiting of the scope of the present invention, nor are the drawings necessarily drawn to scale.

A novel method estimates resource consumption of each application to cause sampling by a processor within a device then across many devices and conditions across the network.

The method first establishes device level means as shown in Equation (2)

$$\text{meanDR\_App}_i\_\text{dev}_j = \frac{\sum_k \text{deltaBL\_App}_i\_\text{dev}_j\_t_k + \sum_l \sum_k \text{deltaBL\_App}_l\_\text{dev}_j\_t_k}{\text{deltaT}_k}$$

Although, here we illustrate how to compute the mean resource consumption and represents a simple statistic (a simple embodiment) to be used when aggregating across devices Additional statistics such as variance and number of samples can also be utilized depending on the statistical methods used at the next layer of processing.

The Equation illustrates that the resource consumption for the App of interest is grouped into two terms, the first term (on the right side of the equation) summarizes resource drain over all the times that the Application is detected to be active. The second term represents the resource drain for all other Apps, which are also consuming resources at the times that the App of interest is active.

Then, statistics for application resource consumption are collected from many devices (i.e., crowd) representative of diverse usage and network environments—"crowd statistics".

$$\text{meanDR\_App}_i = \frac{\sum_j \left( \frac{\sum_k \text{deltaDR\_App}_i\_\text{dev}_{j\_t_k}}{\text{delta}T_k} \right)}{N_i} + \frac{\sum_j \left( \frac{\sum_l \sum_k \text{deltaDR\_App}_l\_\text{dev}_{j\_t_k}}{\text{delta}T_k} \right)}{N_i}$$

Equation (4) represents the resource consumption estimation (e.g., battery drain rate). This Equation is a result of taking Equation 2 and computing mean resource consumption estimate for the App of interest across devices. The first term represents the resource consumption due to the App of interest averaged over all devices (devices with App active). The second term represents a bias due to the resource consumption of other apps that are active when measuring App. As noted in Equation (4) the bias is an average of resource consumption of the individual bias from each device (i.e., "background noise") averaged over all devices (those where App is active, the same ones as in the first term). The bias may be estimated and subtracted from Equation (4) and thus producing an estimate of the resource consumption with correction for bias. One simple estimation technique is simply to take the minimum estimated drain rate of all apps as the estimated bias for any App and then subtract this estimate from the App resource consumption estimate of other Apps.

Now that the resource consumption estimates by App for an individual user or crowd of users are available statistical methods are applied to compare Individual vs. Crowd in order to find devices for which an App over consumes resources. Alternatively, the resource consumption estimate also enables finding applications that over consume resources consistently in the population as compared to the total set of applications in the population via a Crowd vs. Crowd test.

One aspect of the key invention is a method at a server to estimate resource consumption at a wireless mobile device.

The problem to overcome is that an explicit measurement of the battery drain per application is not available. Many pieces of software are simultaneously operative in such a device. The novel resource consumption estimation method works for the special case of not having a direct measurement of each applications battery drain and also for other platforms where we do have explicit measurement of the battery drain per application. In this solution the algorithm is employed for the cases in which we know the resource consumption per app, such as memory use, tx and rx data volume, and cpu use and other resources where we do not have explicit measurement of the resource per application such as battery drain and free memory.

In a non-limiting exemplary embodiment, we illustrate the method in the context of estimating battery drain. We receive a report of battery level (i.e., 100%, 95%, 90%, 85%, 80%, . . . ) measured at certain events in time. At each event-time (i.e., each battery level) a corresponding list of applications is also reported that have been active since the last measurement. At each event-time this list includes the applications that are instantly responsible for draining the battery, however we do not know how much of the 5% any one is responsible for but only that all in aggregate are responsible for this 5% battery drain. Note, although illustrating 5% steps of battery level are shown for expository clarity, such perfect discrete steps are not required for this method. These samples are taken on the device, via the profile, and uploaded to a grid of servers for processing.

Next, for each application on each device, we estimate the mean drain for each application I on device j, i.e., meanDR_Appi_devj. In an embodiment the estimate of Appi drain rate on device j is the average drain rate while Appi is running as in Equation (2), that is it also includes the drain by any other application that was active when App X was active.

In the next step the estimate of App i on Device j is combined with the estimates of App i on every other device in a crowd or globally where App i is running as in Equation (4). We get an estimate for the battery drain rate of App i on all devices in the crowd, i.e., we've averaged over all devices in a crowd. When the crowd is all devices the new quantity can be termed meanDR_Appi.

Aggregate samples of resource drain which include Appi (total drain/total time) to determine an average resource drain while Appi is active.

What's not so obvious is that the method, described can estimate resource consumption especially when the resource consumption (e.g., for battery drain rate) of each App is not known explicitly, and thus the algorithm infers the resource consumption after measuring across many devices. It does this because averaging across all devices j quiets the "background noise" so to speak, where background noise is due to the resource consumption of applications while Appi is running. When we average over all devices then the algorithm measures the average resource that background applications are in addition to that of App i. If Appi is dominating then it will be dominating on most if not all devices so the estimate of meanDR_Appi will be large while the contribution due to background apps will be small compared to the dominate App i. If Appi drains resources at approximately the same level as background apps or if it is small compared to background apps then it is lost in the crowd, so to speak. Furthermore, as previously described, the contribution of background App resource consumption can be estimated and subtracted it out in order to get a better estimate of Appi resource consumption.

Figure 2:
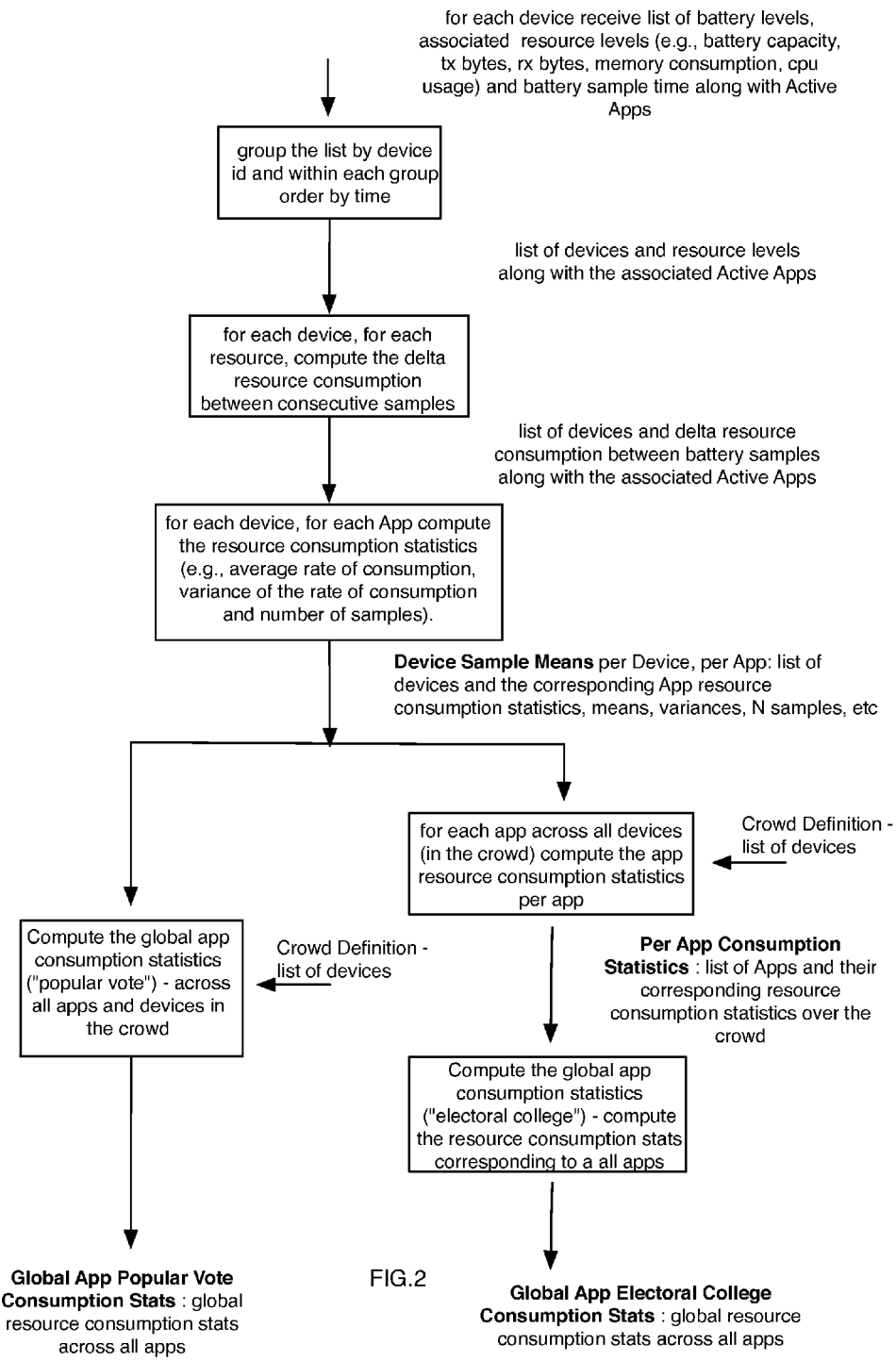

Referring now to FIG. 2, a resource consumption estimation step determines Quality of Service statistics for the Apps in each user device reflecting the user experience with each App. This flow chart describes in detail the computations (in flow Chart form), for the estimation of resource consumption of each Apps and also the resource the statistics (i.e., mean, variance, etc) for the global set of apps as a whole.

In a very brief summary, the diagram shows receiving samples of battery level, time stamp, resource consumption (memory, battery capacity, tx bytes, rx bytes, CPU cycles).

Especially for battery consumption we do not know which app is consuming how much of the battery from one sample to the next. For other resources we know how much each app is consuming and the algorithm works for both cases. In the diagram, and as explained in the text, first device level means are established. Once device level means are established then Per App consumption statistics are established for the set of devices in the specified crowd. The global App consumption stats (mean, variance, Nsamples) is then generated from the Per App Stats by two different methods Electoral College (each app gets a vote) or Popular Vote (each device gets a vote). Each of these sets of Global statistics (Per App Stats, Global Popular Vote and Electoral College) are necessary for Hypothesis testing and discovering which Apps over consume consistently on all devices or Apps that may over consume on some devices. For each App on a user device, the mean, median, standard deviations etc are determined for a variety of resources consumed and events observed. An individual user experience is quantified for each App in a way that may be combined. The individual user experience for each App is summarized by the device and is represented by the aggregation:

$$E\_Appx\_devi = E(App\_X|dev\_i) \qquad \text{Eq.2-1}$$

The aggregation represented by Eq.2-1 signifies the set of statistics representative of experience corresponding to App_X aggregated on the i-th device.

Figure 3:
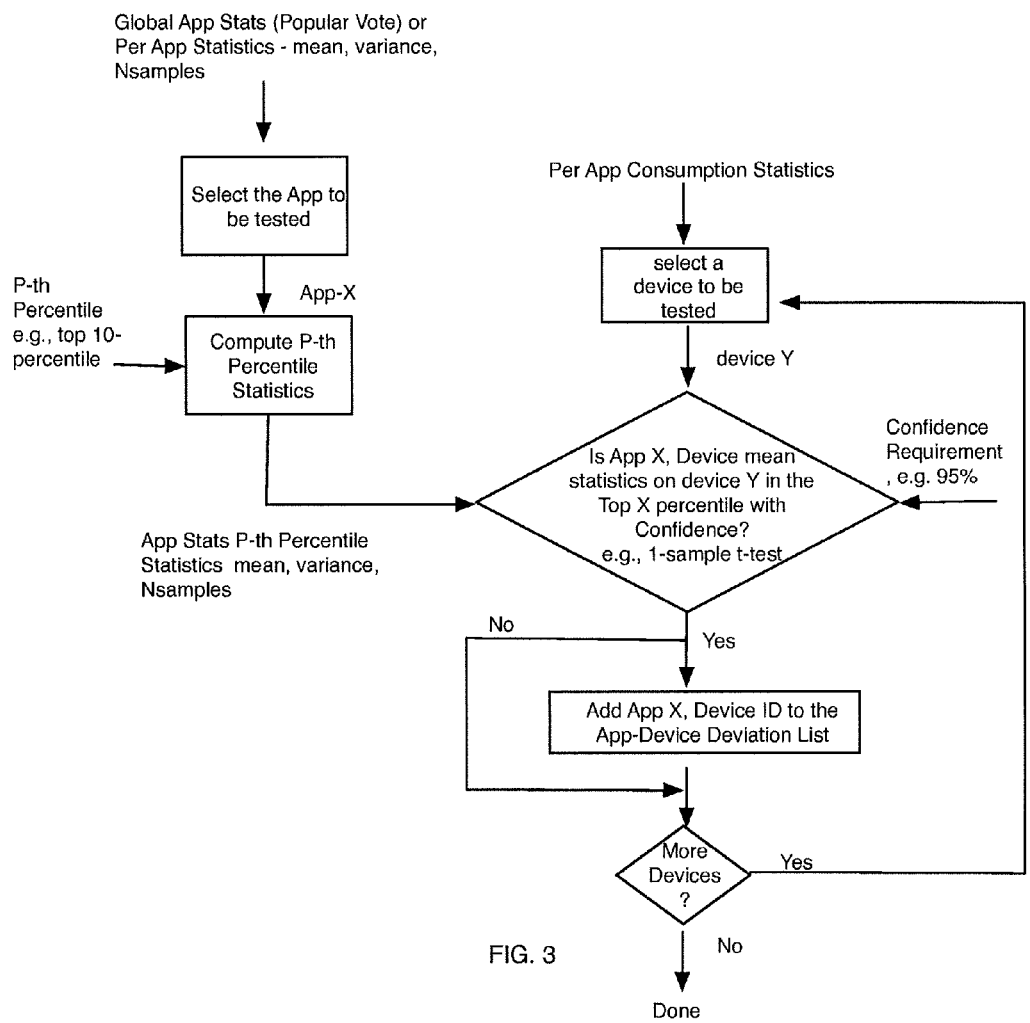

Referring now to FIG. 3, users who share some commonality may be assigned to crowds. The users may be alike in having a quantity of memory, a capacity of battery, a firmware release of an operating system, a likelihood of being within a geofence, a preference for a certain combination of Apps, or demography. Furthermore, the statistics for the crowds shown in FIG. 3 are formulated for the purpose of comparing the individual App X user experience on a device, E_Appx_devi, to that of App X in the crowd. Thus, the crowd experience statistics are formulated as follows, for App X and Crowd k as $$E\_AppX\_Ck\_dev = \int_{i \subset C_k} E\_AppX\_devi \qquad \text{Eq. 3-1}$$

required that the crowd statistics for App X are aggregated over all devices in Crowd K. Such an "Individual to Crowd" comparison compares the App X experience on one device to that of App X in the crowd k. This type of test is useful to identify specific devices (i.e., users) where the user experience corresponding to App X meets or is outside the norms established by the crowd. FIG. 3 suggests that comparisons may be easily made between the results for a single user and the corresponding aggregated results for a crowd. In this analysis, each member of a crowd is equally important. Consider for example App_X on device i and on device j, with similar usage patterns of moderate to light activity, for example opened and closed only a few times per day with total use of only a few minutes in total and resulting in good experience for each user (i.e., device). Next, consider App_X on device k, with heavy use, for example opened hundreds of times per day and poor experience. Although, the activity is much higher for device k, because the experience for device k is summarized locally (i.e., on device k) it does not overwhelm that on two other devices the experience is good. Thus, the experience is good on two devices and bad on one device rather than bad for most of the usages of App X, which would be the case if the statistics were not summarized per device. Furthermore, because this solution pertains to user experience, aggregating the experience statistics per device simplifies further processing of the information. Any further aggregating of the data now pertains to further summarization of per device aggregations of user experience statistics. This is a savings, because there is now one set of experience statistics per device to aggregate rather then potentially thousands or millions per device. An additional Individual to Crowd test is needed. Instead of comparing the experience of App X device i to the App X experience in crowd K, it may be desirable to compare App X experience on device i to the total set of applications in the crowd. For example, this test is useful to find potential outliers to App X experience (or behavior) in crowd K that are out of norm as compared to the total set of Apps in crowd K. The experience statistics for Individual to Crowd comparison to total set of Apps in Crowd k are given as follows.

$$E\_Ck\_dev = \int_{\forall X} \int_{i \subset C_k} E\_AppX\_devi \qquad \text{Eq. 3-2}$$

Eq.3-2 requires that the corresponding App statistics are aggregated over all devices and applications. The individual to crowd tests is designed to find App-Device combinations where an App over consumes resources. The test can test an App against the statistics of all devices that exercise the App (in the given crowd) or against the global set of apps and devices. Our preference is to test against the global set of apps and devices (in the given crowd) because for such a case the App-Device resource consumption is clearly high whereas comparing to a single App there will always be a top 10% and the top 10% may be just fine. As in the previous case an App-Device combination is considered high if its consumption (e.g., battery drain rate) is in the top P-th percentile (10%) as compared to the statistics of the global set (the crowd). The result of the tests is a list of App-Device combinations where the App over consumes resources. For example, because device Y has an old firmware revision, App X may over consume resources on it, however it behaves within norms on all other devices. Again, the exact form of statistical tests is a design choice. The figure illustrates a 1-sample t-test because it is comparing a device mean to a distribution.

Figure 4:
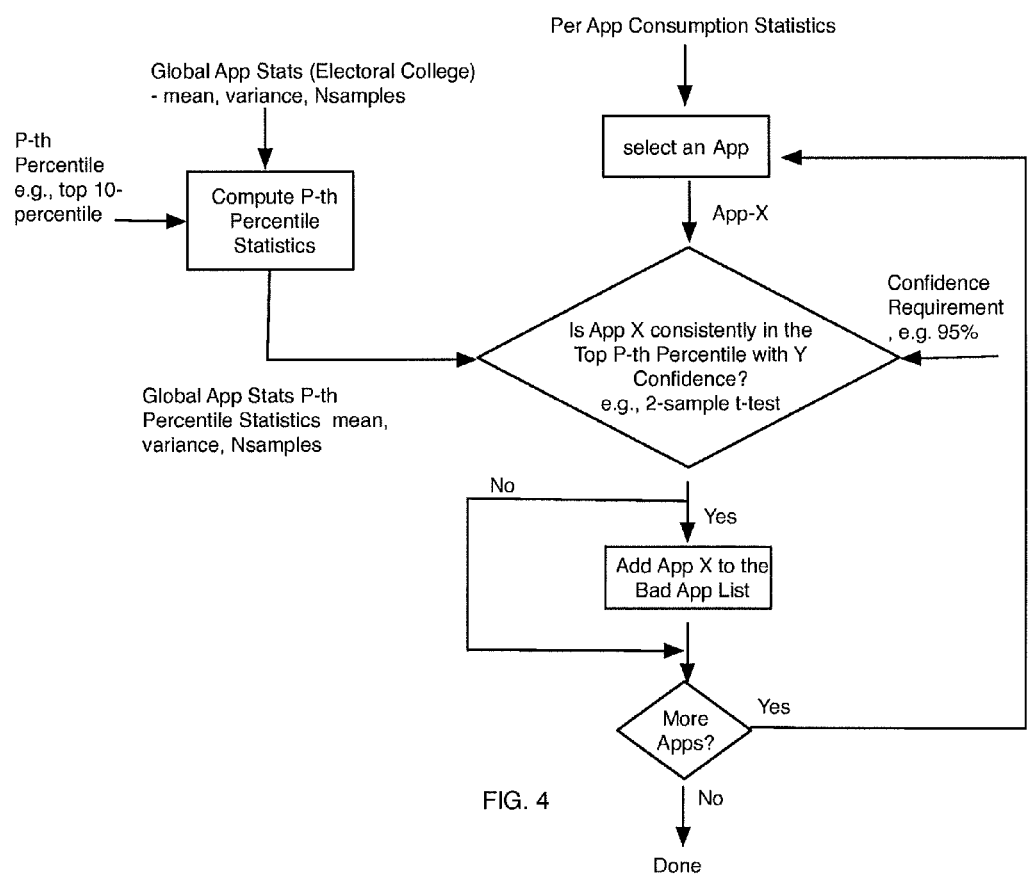

Referring now to FIG. 4, the same statistical data pertaining to a specific App X and Crowd k, as in Eq. 3-1, may be further aggregated to obtain a set of total App statistic for the purpose of "Crowd to Crowd" comparison of the experience of App X (as in Eq.3-1, summarized over devices in Crowd K) compared to the experience of the of the total set of apps in Crowd K. This is a distinct difference in the purpose of the tests and aggregations represented by FIG. 3. In FIG. 3 the tests were of the experience of one App, one device against crowd statistics. However, the tests corresponding to FIG. 4 are for comparing statists of App X over a crowd to the total set of App statistics over the crowd. This test identifies App X applications that behave out of norm for all devices, at a specified level of confidence, in other words percentage of users as compared to the total set of applications in Crowd k. The experience statistics for Crowd to Crowd App experience is given by the following equation $$E\_Ck\_App = \int_{\forall X} E\_AppX\_dev \ i \subset C_k \qquad \text{Eq. 4-1}$$

In an embodiment, the method further includes the steps: for each second application on each device, estimating an average consumption for each second application; determining a mean, median, standard deviation of resource consumption for each resource of each of a subset of devices which have a selected second application in the list of applications that have been active since the last measurement; selecting the group of all devices in the population which has a selected second application in the list of applications; determining a mean, median, standard deviation of resource consumption for all devices in the population which have a selected second application in its respective list of applications recorded at each event-time; and ascribing the mean, median, standard deviation of resource consumption to the selected second application. The crowd to crowd tests takes the results of the resource estimation and identifies Apps that over consume resources on all devices at a specified level of confidence. One resource is selected and tested, for example battery drain rate. The test if an App over consumes is to test if App X is in the top P-th percentile (e.g., 10%) of battery drain rate on all devices with 95% confidence. In other words, if 100 users install and use the App, then at least for 95 of them the battery drain rate associated with App X will be in the top 10% as compared to the global set of apps (i.e., corresponding to the specified crowd). The result of this testing is to test each app against the global statistics and generate a list of apps (for the specified crowd) that over consume resources. The exact form of statistical tests is a design choice. The figure illustrates a 2-sample t-test since the key test specified in the figure is comparing two distributions.

CONCLUSION

The invention can be easily distinguished from conventional analysis by providing a novel App resource consumption estimation method. The method estimates resource first on the mobile device and then infers the Apps resource consumption across devices many devices although such resource consumption information is not known explicitly for each App. By measuring first each user's experience then each Apps resource consumption is equally important to a determination that an App is out of norm in resource consumption. Furthermore, the resource consumption algorithm is combined with statistical methods in order to determine if an App within one device over consumes resources vs. the crowd, that is the App on the users device is out of norm compared to the App in the crowd or other Apps in the crowd. Additionally, the resource estimation method is combined with statistical methods to determine if an App within a crowd over consumes on all devices (users) in the crowd when compared to all Apps and users in the crowd, i.e., the App over consumes for all users in the crowd.

The techniques described herein can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

A number of embodiments of the invention have been described. Nevertheless, it will be understood that various modifications may be made without departing from the spirit and scope of the invention. For example, other network topologies may be used. Accordingly, other embodiments are within the scope of the following claims.

The invention claimed is:

1. A method comprising:
   estimating resource consumption attributable to one or more mobile wireless device applications, by performing the operations:
   receiving, from each of a plurality of mobile wireless devices, a report of remaining resource availability of the mobile wireless device measured by the mobile wireless device at certain events in time, wherein the resource is a consumable resource, and the resource comprises mobile wireless device memory and mobile wireless device battery power;
   receiving, recorded at each event-time, a list of applications of each mobile wireless device that have been active since the last measurement;
   for each first application on each mobile wireless device, estimating an average resource consumption for each first application, wherein explicit knowledge and measurement of a battery drain rate by each first application is not available, and explicit knowledge and measurement of free memory remaining after memory usage by each first application is not available;
   determining a mean, median, and standard deviation of resource consumption for each resource of each of a subset of mobile wireless devices which have a selected first application in the list of applications that have been active since the last measurement;

selecting the group of all mobile wireless devices in the population which have a selected first application in the list of applications;

determining a mean, median, and standard deviation of resource consumption for all mobile wireless devices in the population which have a selected first application in its respective list of applications recorded at each event-time;

ascribing the mean, median, and standard deviation of resource consumption to the selected first application; and using the estimated resource consumption information to identify one or both of: a resource of one of the mobile wireless devices that is being overconsumed by an application; and the application that is overconsuming the resource.

2. The method of claim 1, further comprising:

for each second application on each mobile wireless device, estimating an average resource consumption for each second application;

determining a mean, median, standard deviation of resource consumption for each resource of each of a subset of mobile wireless devices which have a selected second application in the list of applications that have been active since the last measurement;

selecting the group of all mobile wireless devices in the population which has a selected second application in the list of applications;

determining a mean, median, standard deviation of resource consumption for all mobile wireless devices in the population which have a selected second application in its respective list of applications recorded at each event-time; and ascribing the mean, median, standard deviation of resource consumption to the selected second application.

3. The method of claim 2, further comprising: for each first or second application version on each mobile wireless device, estimating an average resource consumption for each first or second application version;

determining a mean, median, standard deviation of resource consumption for each resource of each of a subset of mobile wireless devices which have either selected first application or selected second application in the list of applications that have been active since the last measurement;

selecting the group of all mobile wireless devices in the population which has either one of or both selected first application and selected second application version in the list of applications;

determining a mean, median, standard deviation of resource consumption for all mobile wireless devices in the population which have one of or both first application and second application in its respective list of applications recorded at each event-time;

ascribing the mean, median, standard deviation of resource consumption to the set of first and second applications; and determining if the differences among mean, median, standard deviations of resource consumption of first selected application and second selected application are statistically significant.

4. The method of claim 1 wherein the first application is a first version of a first application and the second application is a second version of the first application, whereby regression testing determines either that a newer version of an application is an improvement or not an unintentional substantial degradation of a previous version of an application.

5. A method to identify Apps that over consume resources on all mobile wireless devices at a specified level of confidence comprising:

estimating resource consumption attributable to one or more mobile wireless device applications, by performing the operations:

receiving, from each of a plurality of mobile wireless devices, a report of remaining resource availability of the mobile wireless device measured by the mobile wireless device at certain events in time, wherein the resource is a consumable resource, and the resource comprises mobile wireless device memory and mobile wireless device battery power;

receiving, recorded at each event-time, a list of applications of each mobile wireless device that have been active since the last measurement;

for each first application on each mobile wireless device, estimating an average resource consumption for each first application, wherein explicit knowledge and measurement of a battery drain rate by each first application is not available, and explicit knowledge and measurement of free memory remaining after memory usage by each first application is not available;

determining a mean, median, and standard deviation of resource consumption for each resource of each of a subset of mobile wireless devices which have a selected first application in the list of applications that have been active since the last measurement;

selecting the group of all mobile wireless devices in the population which have a selected first application in the list of applications;

determining a mean, median, and standard deviation of resource consumption for all mobile wireless devices in the population which have a selected first application in its respective list of applications recorded at each event-time;

ascribing the mean, median, and standard deviation of resource consumption to the selected first application;

using the estimated resource consumption information to identify one or both of: a resource of one of the mobile wireless devices that is being overconsumed by an application; and the application that is overconsuming the resource;

receiving results of the resource consumption estimation;

testing if App X is in the top P-th percentile of resource consumption on all devices with 95% confidence; and generating, for a specified crowd, a list of apps that over consume resources.

6. The method of claim 5 wherein the test is a 2-sample t-test since the key test is comparing two distributions.

7. A method to find App-Device combinations where an App over consumes resources comprising:

estimating resource consumption attributable to one or more mobile wireless device applications, by performing the operations:

receiving, from each of a plurality of mobile wireless devices, a report of remaining resource availability of the mobile wireless device measured by the mobile wireless device at certain events in time, wherein the resource is a consumable resource, and the resource comprises mobile wireless device memory and mobile wireless device battery power;

receiving, recorded at each event-time, a list of applications of each mobile wireless device that have been active since the last measurement;

for each first application on each mobile wireless device, estimating an average resource consumption for each first application, wherein explicit knowledge and measurement of a battery drain rate by each first application is not available, and explicit knowledge and measurement of free memory remaining after memory usage by each first application is not available;

determining a mean, median, and standard deviation of resource consumption for each resource of each of a subset of mobile wireless devices which have a selected first application in the list of applications that have been active since the last measurement;

selecting the group of all mobile wireless devices in the population which have a selected first application in the list of applications;

determining a mean, median, and standard deviation of resource consumption for all mobile wireless devices in the population which have a selected first application in its respective list of applications recorded at each event-time;

ascribing the mean, median, and standard deviation of resource consumption to the selected first application; and using the estimated resource consumption information to identify one or both of: a resource of one of the mobile wireless devices that is being overconsumed by an application; and the application that is overconsuming the resource;

testing an APP against a global set of applications and mobile wireless devices;

denoting an App-Device combination as high when the estimated resource consumption information indicates that the estimated resource consumption of the App-Device combination is in the top P-th percentile as compared to the statistics of the global set; and generating a list of App-Device combinations where the App over consumes resources.

8. The method of claim 7 wherein the test is a 1-sample t-test.

9. A non-transitory storage device having stored therein computer-executable instructions which, when executed by one or more hardware processors of a computing system, perform:

estimating resource consumption attributable to one or more mobile wireless device applications, by performing the operations:

receiving, from each of a plurality of mobile wireless devices, a report of remaining resource availability of the mobile wireless device measured by the mobile wireless device at certain events in time, wherein the resource is a consumable resource, and the resource comprises mobile wireless device memory and mobile wireless device battery power;

receiving, recorded at each event-time, a list of applications of each mobile wireless device that have been active since the last measurement;

for each first application on each mobile wireless device, estimating an average resource consumption for each first application, wherein explicit knowledge and measurement of a battery drain rate by each first application is not available, and explicit knowledge and measurement of free memory remaining after memory usage by each first application is not available;

determining a mean, median, and standard deviation of resource consumption for each resource of each of a subset of mobile wireless devices which have a selected first application in the list of applications that have been active since the last measurement;

selecting the group of all mobile wireless devices in the population which have a selected first application in the list of applications;

determining a mean, median, and standard deviation of resource consumption for all mobile wireless devices in the population which have a selected first application in its respective list of applications recorded at each event-time;

ascribing the mean, median, and standard deviation of resource consumption to the selected first application; and using the estimated resource consumption information to identify one or both of: a resource of one of the mobile wireless devices that is being overconsumed by an application; and the application that is overconsuming the resource.

10. A non-transitory storage device having stored therein computer-executable instructions which, when executed by one or more hardware processors of a computing system, perform:

receiving results of a resource consumption estimation;

testing if App X is in the top P-th percentile of resource consumption on all devices with 95% confidence; and generating, for a specified crowd, a list of apps that over consume resources, wherein the resource consumption estimation comprises the operations:

receiving, from each of a plurality of mobile wireless devices, a report of remaining resource availability of the mobile wireless device measured by the mobile wireless device at certain events in time, wherein the resource is a consumable resource, and the resource comprises mobile wireless device memory and mobile wireless device battery power;

receiving, recorded at each event-time, a list of applications of each mobile wireless device that have been active since the last measurement;

for each first application on each mobile wireless device, estimating an average resource consumption for each first application, wherein explicit knowledge and measurement of a battery drain rate by each first application is not available, and explicit knowledge and measurement of free memory remaining after memory usage by each first application is not available;

determining a mean, median, and standard deviation of resource consumption for each resource of each of a subset of mobile wireless devices which have a selected first application in the list of applications that have been active since the last measurement;

selecting the group of all mobile wireless devices in the population which have a selected first application in the list of applications;

determining a mean, median, and standard deviation of resource consumption for all mobile wireless devices in the population which have a selected first application in its respective list of applications recorded at each event-time;

ascribing the mean, median, and standard deviation of resource consumption to the selected first application; and using the estimated resource consumption information to identify one or both of: a resource of one of the mobile wireless devices that is being overconsumed by an application; and the application that is overconsuming the resource.

11. The method of claim 5, wherein the top P-th percentile is the top 10%.

12. The method as recited in claim 7 wherein consumption of the resource corresponds to a battery drain rate.

13. The method of claim 7, wherein the top P-th percentile is the top 10%.

* * * * *